Sept. 23, 1958 W. C. ESPENLAUB 2,853,548

SIGNAL-TRANSLATING APPARATUS

Filed Jan. 27, 1955 2 Sheets-Sheet 1

2,853,548

SIGNAL-TRANSLATING APPARATUS

Walter C. Espenlaub, Syosset, N. Y., assignor to Hazeltine Research, Inc., Chicago, Ill., a corporation of Illinois Application January 27, 1955, Serial No. 484,531

9 Claims. (Cl. 178—5.4)

*General*

Figure 1:
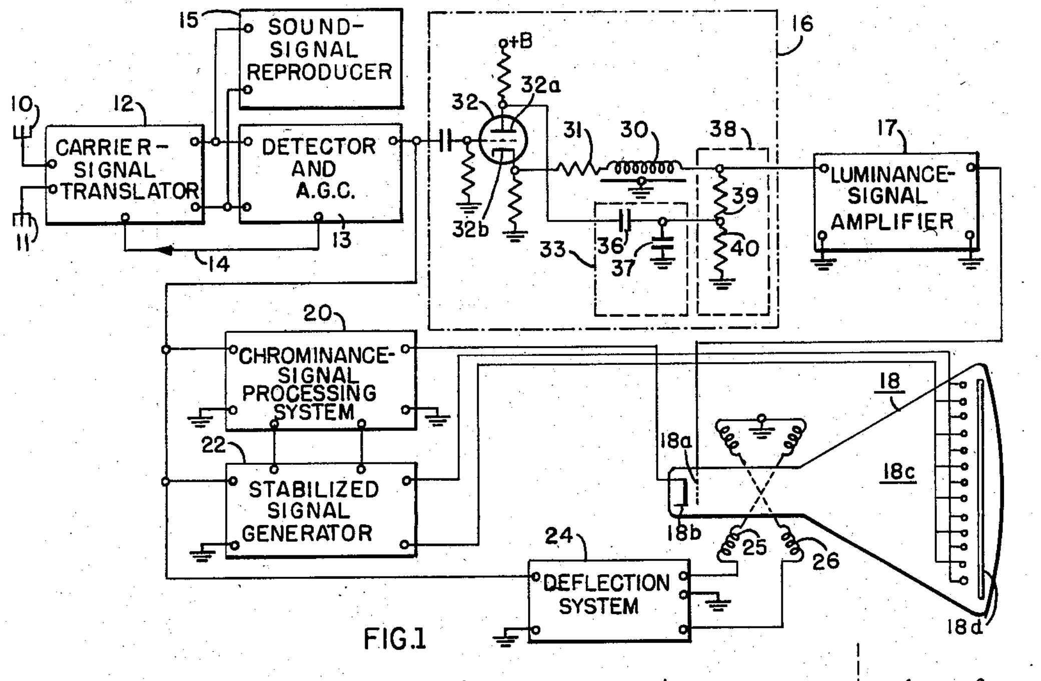

This invention relates to signal-translating apparatus and, particularly, to signal-translating apparatus, such as color-television receivers, having a plurality of signal-translating channels of different band widths.

In a color-television receiver, for example, there is a channel for translating the luminance signal and one or more channels for translating chrominance signals. As is well known, the band width of the luminance channel is appreciably greater than the band width of the chrominance channel. One result of this band-width difference is that the narrow band chrominance channel has a greater transmission time than the wide band luminance channel. It is, therefore, conventional practice to include a time-delay network, such as a delay line, in the luminance channel for equalizing the time delays of the luminance and chrominance channels so that the luminance and chrominance information may be supplied to the picture tube with the proper time correspondnce.

It is also generally known that undesirable limitations or deficiencies of the receiver including the display device thereof may be compensated for by suitably modifying the frequency-translating characteristics of, for example, the luminance channel. In this manner, the appearance of the reproduced color image may be improved, for example, by boosting or accentuating the high-frequency components of the signal translated by the luminance channel.

A similar situation exists with respect to the I and Q chrominance channels of a conventional color receiver. In this manner, a delay line may be included in the relatively wide band I chrominance channel to equalize the transmission times of the I chrominance channel and the relatively narrow band Q chrominance channel. Also, the appearance of the reproduced color image may be improved by modifying the frequency-translating characteristics of the I chrominance channel.

It is an object of the invention, therefore, to provide new and improved apparatus including a time-delay network for obtaining time-delay equalization between signal channels and for obtaining a desired modification of the frequency-translating characteristics of the channel including the delay network.

It is another object of the invention, in signal-translating apparatus having a plurality of signal channels and including in one of the channels a time-delay network for equalizing the time delay between channels, to utilize the delay network for obtaining a desired modification of the frequency-translating characteristics of the channel including the delay network.

It is a further object of the invention to provide new and improved color-television apparatus whereby high-frequency boost with linear phase is obtained in, for example, the luminance channel with the addition of a small number of inexpensive components.

Signal-translating apparatus in accordance with the invention comprises a first channel for translating a first signal and having a first transmission time and a second channel for translating a second signal and having a second and different transmission time. The apparatus also includes a delay network having a predetermined phase-shift characteristic and a time delay corresponding to at least part of the difference in transmission times of the first and second channels and included in the first channel for equalizing the transmission time of the first and second channels. The apparatus further includes a filter network responsive to the signal applied to the delay network for translating selected frequency components thereof and having a phase-shift characteristic over the selected frequency range which is of substantially the same shape and slope as the corresponding portion of the predetermined phase-shift characteristic of the delay network. The apparatus additionally includes circuit means for combining the signals translated by the delay network and the filter network to produce a desired modification of the frequency-translating characteristics of the first channel.

For a better understanding of the present invention, together with other and further objects thereof, reference is had to the following description taken in connection with the accompanying drawings, and its scope will be pointed out in the appended claims.

Figure 2:
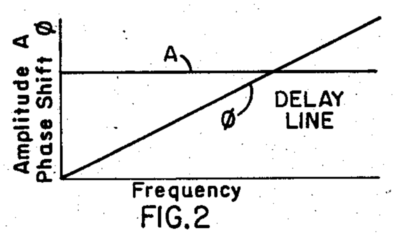
Figures 6, 7:
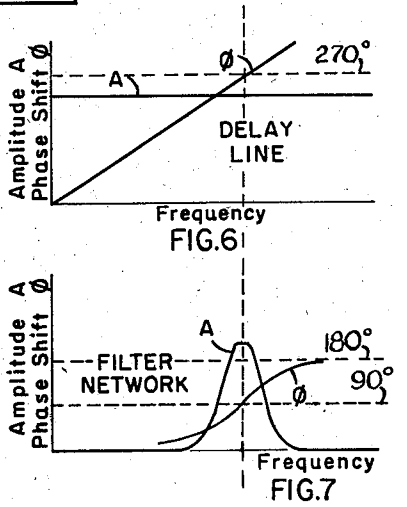
Figure 3:
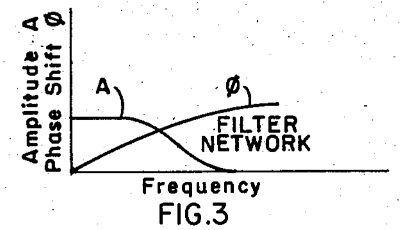
Figure 4:
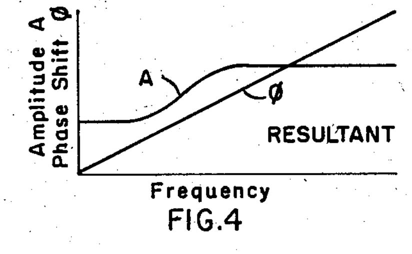
Figure 8:
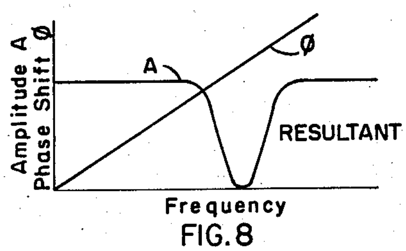
Figure 5:
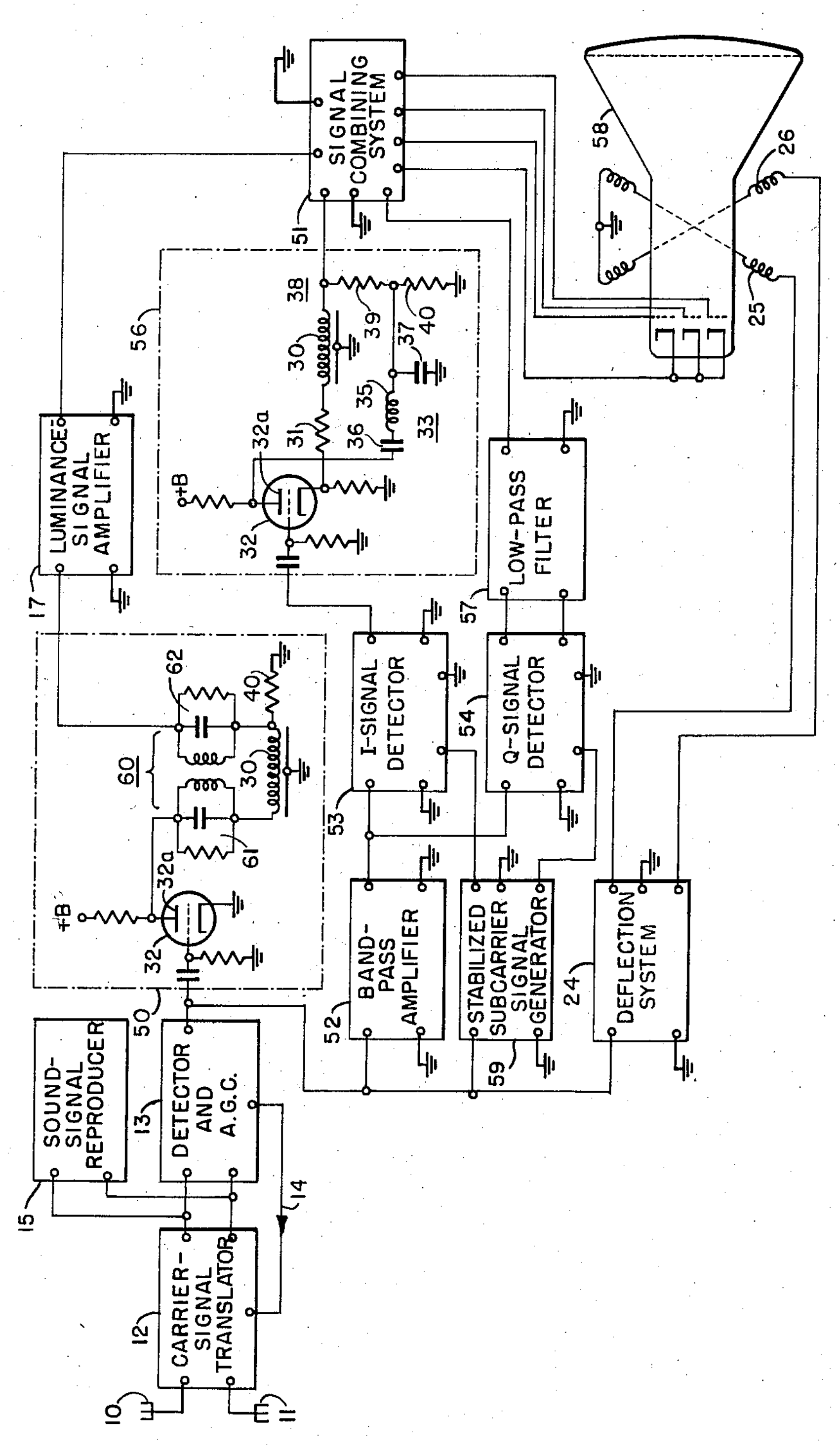

Referring to the drawings:

Fig. 1 is a circuit diagram, partly schematic, of a color-television receiver utilizing a "one-gun" display device and including signal-translating apparatus constructed in accordance with the present invention;

Figs. 2, 3, and 4 are graphs representing the frequency-translating characteristics of various components of the Fig. 1 receiver;

Fig. 5 is a circuit diagram, partly schematic, of a color-television receiver utilizing a "three-gun" display device and including signal-translating apparatus constructed in accordance with the present invention, and Figs. 6, 7, and 8 are graphs representing the frequency-translating characteristics of various components of the Fig. 5 receiver.

*Description and operation of Fig. 1 "one-gun" receiver*

Referring to Fig. 1 of the drawings, the color-television receiver utilizing a "one-gun" display device there represented comprises an antenna system 10, 11 coupled to a carrier-signal translator 12 for supplying the received color-television signal thereto. The carrier-signal translator 12 is of conventional construction and may include, for example, a radio-frequency amplifier, an oscillator-modulator, and an intermediate-frequency amplifier for amplifying the received color-television signal and changing the carrier frequency thereof to an intermediate-frequency value.

The intermediate-frequency signal from the carrier-signal translator 12 is supplied to a detector and AGC circuit 13, of conventional construction, which is effective to remove the video-frequency components from the carrier-frequency signal and supply these video-frequency components which constitute a composite video-frequency signal including luminance, chrominance, and synchronizing information to the output terminals thereof. The unit 13 is also effective to develop a control voltage representative of the amplitude of the carrier signal, which control voltage is fed back by way of conductor 14 for automatically controlling the gain of appropriate stages of the carrier-signal translator 12 in a conventional manner.

Also coupled to the output terminals of the carrier-signal translator 12 is a sound-signal reproducer 15 for separating, amplifying, and detecting the sound component of the intermediate-frequency signal. The sound-signal reproducer 15 is of conventional construction and may include, for example, a frequency-modulation detector, audio-frequency amplifier, and a loudspeaker for converting the audio-frequency signal into audible sound signals.

Coupled to the output terminal of the detector 13 is a luminance channel for translating the luminance component of the composite video signal. The luminance channel may include, for example, a signal-modifying circuit 16, to be discussed in detail hereinafter, and a luminance-signal amplifier 17 of conventional construction. The amplified luminance signal is supplied by the luminance-signal amplifier 17 to a suitable control electrode **18*a* of a conventional image-reproducing tube 18** of the one-gun type.

The composite video signal from the detector of unit 13 is also supplied to a chrominance channel for translating the chrominance component thereof. The chrominance channel may include, for example, a chrominance-signal processing system 20 which is effective to extract the color subcarrier component from the composite video signal, obtain the desired chrominance components therefrom, and amplify and combine these chrominance components of the subcarrier signal to periodically and successively supply the red, green, and blue chrominance signals to a cathode **18*b* of the image-reproducing tube 18. The chrominance-signal processing system 20** may be of conventional construction and may take the form of apparatus described in an article entitled "Processing of the NTSC color signal for one-gun sequential color displays" by B. D. Loughlin and appearing in the January 1954 issue of the Proceedings of the I. R. E. at page 299.

The composite video signal from the detector of unit 13 is also supplied to a stabilized signal generator 22 of conventional construction. The generator 22 may include, for example, a 3.58 megacycle reference-signal oscillator, suitable synchronizing circuits for synchronizing the operation thereof with the sync burst component of the composite video signal, and frequency-multiplying circuits for developing desired harmonic signals. The fundamental 3.58 megacycle reference signal and the desired harmonics thereof are supplied to the chrominance-signal processing system for controlling the operation thereof. The 3.58 megacycle signal is also supplied to the beam-control grids **18*c* of the image-reproducing tube 18 for controlling deflection of the electron beam between adjacent red, green, and blue phosphor strips on the phosphor plate 18*d* of the tube 18. In this manner, the signal generator 22 is effective to enable the processing system 20 to supply, for example, red chrominance information to the cathode 18*b*** during the time intervals when the electron beam is impinging on the red phosphor strips, a corresponding result being obtained for the green and blue chrominance information.

The composite video signal from the detector of unit 13 is additionally supplied to a deflection system 24 of conventional construction and which may include, for example, a synchronizing-signal separating circuit, a line-scanning generator, and a field-scanning generator for supplying line-scanning signals and field-scanning signals to the corresponding horizontal deflection winding 25 and vertical deflection winding 26 disposed adjacent the image-reproducing tube 18. In this manner, the electron beam of the tube 18 is caused to scan the phosphor plate **18*d*** in a conventional manner.

*Description of Fig. 1 signal-translating apparatus*

Referring to Fig. 1 of the drawings, signal-translating apparatus constructed in accordance with the present invention will now be described with reference to the color-television receiver environment there indicated. Accordingly, the present invention comprises a first channel for translating a first signal and a second channel for translating a second signal. With reference to the Fig. 1 receiver, the first channel may be the luminance channel represented by the unit 16 and the luminance-signal amplifier 17 while the second channel may be the chrominance channel represented by the chrominance-signal processing system 20.

Apparatus in accordance with the present invention also includes a delay network having a predetermined phase-shift characteristic and included in the first or luminance channel for equalizing the transmission time of the luminance and chrominance channels. The delay network may be, for example, a delay line 30 which is coupled through a coupling resistor 31 and an amplifier tube 32 to the output terminals of the detector of unit 13. The delay line 30 may be of conventional construction and may have a time delay of the order of 0.5–1.0 microsecond.

Apparatus in accordance with the present invention further includes a filter network responsive to the signal applied to the delay network for translating selected frequency components thereof and having a phase-shift characteristic over the selected frequency range which is substantially the same as, that is, of substantially the same shape and slope as, the corresponding portion of the predetermined phase-shift characteristic of the delay network. The filter network may comprise, for example, a filter network 33 responsive to the signal applied to the amplifier tube 32 and hence to the delay line 30 and network 33 for translating selected frequency components of that signal. The filter network 33 preferably has a phase-shift characteristic over the major portion of the selected frequency range which is substantially the same as the corresponding portion of the phase-shift characteristic of the delay line 30. The filter network 33 is coupled through the amplifier tube 32 to the output terminals of the detector of unit 13. For the environment shown in Fig. 1, the filter network 33 may be, for example, a low-pass filter including a low-impedance coupling condenser 36 and a condenser 37 for giving the filter its low-pass characteristics.

The substantial identity of the phase-shift characteristics of networks 30 and 33 over the selected frequency range of network 33 contributes to a very desirable minimization of phase distortions in the signal. Such phase distortions cause an undesirable picture distortion known as "ringing." This minimization is accomplished inexpensively by utilizing the delay line 30 for that purpose as well as its normal delay function.

Apparatus in accordance with the invention also includes circuit means for combining the signals translated by the delay network and the filter network to produce a desired modification of the frequency-translating characteristics of the luminance channel. This combining circuit means may comprise, for example, circuit means for combining the signals translated by the delay line 30 and the filter network 33 in a subtractive manner to produce a desired modification of the frequency-translating characteristics of the luminance channel such that the frequency components not selected by the low-pass filter network 33 are accentuated. To be more specific, the combining circuit means may include a phase-inverter circuit included in the luminance channel for inverting the polarity of the signal translated by the filter network 33 relative to the polarity of the signal translated by the delay line 30 and an adder circuit 38 for combining the signals translated by the delay line 30 and the filter network 33 in an additive manner to produce the desired modification.

The phase-inverter circuit may include, for example, the amplifier tube 32 and its associated circuit whereby the signal developed at the anode **32*a* thereof and supplied to the filter network 33 is of opposite polarity to the signal developed at the cathode 32*b* thereof and supplied to the delay line 30**.

The adder circuit 38 may include, for example, series-connected resistors 39 and 40 connected between the output terminal of the delay line 30 and ground. The junction between resistor 39 and resistor 40 is connected to the output terminal of the filter network 33 so that resistor 40 is mutual to the output circuits of both the delay line 30 and the filter network 33. The adder circuit 38 is, in turn, coupled to the luminance-signal amplifier 17 previously mentioned.

As shown in the drawings, the signal path from the anode 32*a* of the amplifier tube 32, through the filter network 33, and including the adder circuit 38 is effectively coupled in parallel with the delay line 30. It should be noted, however, that this path need not be coupled in parallel with the entire length of the delay line but, where desirable, may be coupled across only a portion thereof.

*Operation of Fig. 1 signal-translating apparatus*

Considering now the operation of the apparatus just described, the transmission time of the chrominance channel 20 is greater than that of the luminance channel 16, 17 because of the more limited band width of the chrominance channel. The delay line 30 is, therefore, included in the luminance channel to increase the transmission time thereof so as to equalize the transmission time of the luminance and chrominance channels thereby bringing the luminance information into synchronism with the chrominance channel in the reproduced color image.

As previously mentioned, it is often desirable to modify the luminance signal in such a manner as to compensate for receiver limitations or deficiencies. For example, where the frequency response of the system transmission channel is not uniform over the entire pass band required by the composite video signal, it is found that the high-frequency components of the composite video signal are attenuated relative to the low-frequency components thereof. Consequently, it is desirable to boost or accentuate these high-frequency components so that the sharpness or crispness of the image is maintained. Also, the display device itself may give rise to undesirable attenuation of certain frequency components of the reproduced image. For example, in display devices of the one-gun type electron scattering gives rise to a so-called "aperture distortion" which effectively attenuates the high-frequency components of the reproduced image. Accordingly, it is also desirable to boost the high-frequency components of the luminance signal to compensate for this effect. These receiver deficiencies are only typical and other receiver deficiencies may render it desirable to modify the luminance signal in some other fashion.

In order to modify, in a desirable manner, the signal translated by, for example, the luminance channel 16, 17, it is necessary to modify the frequency-translating characteristics of that channel. Considering for the moment the case where it is desirable to boost or accentuate the high-frequency components of the luminance signal relative to the low-frequency components thereof in order to produce a sharper or more "crisp" image, it is then necessary to modify the luminance channel so that the transmission of the high-frequency components is favored. That accentuating the high-frequency components of the luminance signal improves the sharpness of the reproduced image will be apparent when it is remembered that the high-frequency portion of the luminance signal corresponds to the areas of rapid change in light value of the reproduced image, such as the edges of well-defined objects.

It might appear that the high-frequency components of the luminance signal could be accentuated by inserting the proper frequency-sensitive network directly into the luminance channel. Such networks or filters, however, have undesirable phase-shift characteristics over the low-frequency portion of their operating range and, hence, would cause considerable distortion of the low-frequency portion of the luminance signal.

A more desirable approach is to proceed in accordance with the present invention and utilize a signal path in parallel with the delay line 30. In this manner, the parallel signal path may be designed to give the desired frequency modification while the linear phase-shift characteristic of the delay line 30 dominates to prevent undesirable phase-shift distortion. In this manner, the desirable characteristics of the parallel signal path and the delay line 30 may be combined to produce the desired signal modification in the luminance channel without undue phase distortion.

To be more specific, the delay line 30 has amplitude and phase-shift characteristics as indicated by the curves of Fig. 2. As indicated by the amplitude curve A, the amplitude of a signal passing through the delay line 30 is unaffected by the frequency thereof. The phase-shift curve $\phi$ is linear thus indicating that a constant or fixed time delay is provided without phase distortion. This will be seen when it is remembered that the phase-shift curve $\phi$ is plotted in terms of degrees of a cycle of each frequency considered where 360° corresponds to one cycle. Thus, it is necessary to shift the phase of the high-frequency components a greater fraction of their respective cycles in order to maintain the same time relationship with respect to the lower frequency components. The slope of the phase-shift curve $\phi$ is representative of the time delay of the delay line 30.

Now let the parallel signal path include the conductor connected from the anode 32*a* of the amplifier 32 to the filter network 33, the low-pass filter network 33 itself, and the adder circuit 38. Because this signal path is coupled to the anode 32*a* of the amplifier tube 32, whereas the delay line 30 is coupled to the cathode 32*b* thereof, the signal supplied to the filter network 33 is of polarity opposite to the polarity of the signal supplied to the delay line 30. Fig. 3 indicates the amplitude and phase-shift characteristics of the low-pass filter network 33. The amplitude curve A indicates the low-pass nature of the filter network 33 and shows that the high-frequency components of the luminance signal are not translated thereby. The phase-shift curve $\phi$ is approximately linear over the pass band of the network 33. The resistor 40 of the adder circuit 38, being mutual to both the filter network 33 and the delay line 30, is effective to combine the signals supplied thereto by the network 33 and the delay line 30 in an additive manner.

The effect of placing this signal path in parallel with the delay line 30 is to cause the amplitude-response curve A of the filter network 33 to combine in a subtractive manner with the amplitude-response curve A of the delay line 30 thus resulting in a composite amplitude-translating characteristic as indicated by the amplitude curve A of Fig. 4. This occurs because the low-frequency components passed by the filter network 33 are of reverse polarity and hence subtract from or cancel a portion of the low-frequency components translated by the delay line 30. The composite amplitude curve A of Fig. 4 clearly indicates that the high-frequency components of the signal translated by the signal-modifying circuit 16 are boosted or accentuated relative to the low-frequency components thereof.

In order that no phase distortion should occur because of differences in the relative phases or times of ccurrence of the corresponding components of the signal translated by the delay line 30 and the filter network 33, it is essential that these units have substantially the shame shape and slope of phase-shift characteristic over the central portion of the pass band of the filter network 33. In other words, the filter network 33 should have a linear phase-shift characteristic over its pass band and the slope of its phase-shift curve $\phi$ should be the same as that of the delay line 30. In this manner, the time delay imparted to the low-frequency components translated through the filter network 33 is substantially equal to the time delay imparted to these same components when translated through the delay line 30. No phase distortion then occurs because the phase-shift characteristics are the same over the low-frequency range where both the delay line 30 and the filter network 33 are translating a substantial amount of the signal, while over the higher frequency range where the phase-shift characteristic of the filter network 33 differs nearly all of the signal is translated by the delay line 30.

The amount or degree of accentuation of the high-frequency components may be controlled by selecting the relative values of the resistors 39 and 40 of the adder circuit 38. In this manner, the amount of inverse-polarity low-frequency components combined with the low-frequency components from the delay line 30 may be adjusted to give the desired amount of accentuation.

It will be noted that the high-frequency components might also be accentuated by omitting the signal inversion produced by tube 32, having the filter network 33 pass only the high-frequency components, and then adding these noninverted high-frequency components to those translated by the delay line 30. It is also to be noted that the present invention is not limited to accentuating the high-frequency components of the luminance signal because, by proper design of the filter network 33, the composite characteristic of the delay line 30 and filter network 33 may be selected to modify the luminance signal in a different manner to compensate for other limitations or deficiencies of the receiver.

One of the features of the present invention will be apparent when the simplicity and inexpensiveness of utilizing the present invention are considered. This occurs because the amplifier tube 32 and associated components, the resistor 31, the delay line 30, and the luminance-signal amplifier 17 are normally present in a color-television receiver of conventional design. Thus, in order to achieve the advantages of the present invention, all that is necessary is to add a small number of passive components in accordance with the teachings of the present invention.

*Description and operation of Fig. 5 "three-gun" receiver*

Referring now to Fig. 5 of the drawings, there is represented a color-television receiver of the type utilizing a "three-gun" display device and including signal-translating apparatus constructed in accordance with the present invention. The antenna system 10, 11, the carrier-signal translator 12, the detector and AGC unit 13, the sound-signal reproducer 15, the luminance-signal amplifier 17, and the deflection system 24 may be identical in construction and operation to the corresponding units of the Fig. 1 "one-gun" receiver so that a detailed description of the construction and operation thereof is unnecessary at this point. As mentioned, there is supplied to the output terminals of the detector of unit 13 a composite video signal which includes the desired luminance, chrominance, and synchronizing information in accordance with the FCC approved NTSC color-television signal specification. The luminance component of the composite video signal is supplied through a signal-modifying circuit 50, which will be described more fully hereinafter, and the luminance-signal amplifier 17 to a signal-combining system 51 of conventional construction.

The chrominance component of the composite video signal is supplied to a conventional band-pass amplifier 52 of the chrominance channel. The band-pass amplifier 52 is, in turn, coupled to an I-signal detector 53 and a Q-signal detector 54. The I-signal detector 53 may be, for example, a synchronous detector of conventional construction and is effective to remove chrominance information from the chrominance subcarrier at a desired phase angle in a conventional manner. Likewise, the Q-signal detector 54 may be a conventional synchronous detector for removing chrominance information from the chrominance subcarrier at a phase angle which is in quadrature with the phase angle selected by the I-signal detector 53. In this manner, the chrominance information is split into an I-signal chrominance channel and a Q-signal chrominance channel.

The I-signal detector 53 is, in turn, coupled through a signal-modifying circuit 56, which will be mentioned more fully hereinafter, to the signal-combining system 51. The Q-signal detector 54 is similarly connected to the signal-combining system 51 through a conventional low-pass filter 57. In accordance with the NTSC signal specification, the Q-signal information requires a nominal band-width value of 0.5 megacycle while the I-signal information requires a band width of 1.5 megacycles. As a result, it is conventional practice to design the I and Q chrominance channels to have only the needed amount of band width. As a result of the increased band width of the I chrominance channel relative to the Q chrominance channel, the I channel transmission time is less than that of the Q channel.

The signal-combining system 51 may include conventional matrixing circuits for combining the luminance signal and the I and Q chrominance signals supplied thereto in order to develop the desired red, green, and blue color signals which, in turn, are supplied to the control electrodes of a conventional three-gun display device 58 of the shadow-masking type. The display device 58 then operates in a conventional manner to produce the color image on the display screen thereof.

The composite video signal from the detector of unit 13 is also supplied to a stabilized subcarrier signal generator 59 of conventional construction. The generator 59 may include, for example, suitable oscillator and phase-shift circuits for producing a pair of 3.58 megacycle subcarrier reference signals in phase quadrature with one another, these reference signals being supplied to the I-signal and Q-signal detectors 53 and 54 for enabling detection of the desired chrominance components therein. The stabilized subcarrier signal generator 59 may also include conventional phase-comparing and reactance-tube circuits for synchronizing the operation thereof with the subcarrier frequency syn burst component of the composite video signal supplied thereto.

*Description of Fig. 5 signal-translating apparatus*

Before discussing in detail the components of the signal-translating apparatus constructed in accordance with the present invention with reference to the "three-gun" receiver environment of Fig. 5, it will be helpful to consider some of the ways in which the present invention may be applied to the Fig. 5 receiver. Considering for the moment the chrominance channel including units 52, 53, 54, and 56 as an entity, it will be remembered that the transmission time of this chrominance channel is greater than the transmission time of the luminance channel including units 50 and 17 because of the more limited band width of the chrominance channel. It is, therefore, customary to include a delay network in the luminance channel to equalize the relative time delay of the luminance and chrominance channels. As previously considered, it is also frequently desirable to modify the frequency-translating characteristics of the luminance channel to compensate for some limitation or deficiency of the receiver or to perform some other desired function. As indicated with respect to the Fig. 1 "one-gun" receiver, it is sometimes advantageous to boost the high-frequency components of the luminance signal. This may be achieved in the Fig. 5 "three-gun" receiver by making the signal-modifying circuit 50 thereof identical in construction with the corresponding signal-modifying circuit 16 of Fig. 1. This may be a useful and highly desirable thing to do in the Fig. 5 receiver but, because this type of signal modification is fully described with reference to the Fig. 1 receiver and because its application to the Fig. 5 receiver is apparent, little would be gained from a restatement of this operation at this point. As a result, the luminance channel signal-modifying circuit 50 of Fig. 5 will be described in terms of a different and also desirable type of signal modification that may be obtained along with the other advantages of the present invention. The signal modification which will be illustrated with reference to the signal-modifying circuit 50 of Fig. 5 is the elimination in the luminance channel of the subcarrier component of the composite video signal which is supplied to the luminance channel. It is to be noted that both this last-mentioned signal modification by way of circuit 50 and the previously mentioned modification of boosting the high-frequency components by way of circuit 16 may be obtained in conjunction with the same delay line.

Signal-translating apparatus in accordance with the present invention is not limited to the specific functions and elements just mentioned because, for example, the same situation exists within the chrominance channel itself. To be more specific, the chrominance channel is broken down into an I-signal chrominance channel and a Q-signal chrominance channel, each having a different band width. Because of the reduced band width of the Q channel that channel has a greater transmission time than the I channel. As a result, it is customary to include a delay network in the I-signal channel in order to equalize the relative time delays of the I and Q chrominance channels. Also, it is frequently desirable to modify the frequency-translating characteristics of the I chrominance channel in order to compensate for other limitations of the receiver. For example, because of vestigial side-band transmission of the I chrominance information, there is a deficiency of high-frequency I-signal information at the output of the I-signal detector 53. As a result, it is desirable to boost the high-frequency components of the I chrominance signal in order to compensate for the deficiency of high-frequency information. Accordingly, the signal-modifying circuit 56 shown in the I-signal chrominance channel will be explained with reference to this feature of boosting the high-frequency components of the I chrominance signal.

For the first-mentioned example of delay equalization between the luminance and chrominance channels and elimination of the subcarrier component in the luminance channel, signal-translating apparatus in accordance with the present invention comprises a first channel for translating a first signal and a second channel for translating a second signal. In this case, the first channel is the luminance channel and the second channel is the chrominance channel.

The apparatus also includes a delay network having a predetermined phase-shift characteristic included in the first channel for equalizing the transmission time of the first and second channels. This delay network is represented by the delay line 30 of the signal-modifying circuit 50 of which the input terminal is coupled by way of the amplifier tube 30 to the detector of unit 13 while the output terminal thereof is coupled to the luminance-signal amplifier 17.

The apparatus additionally includes a filter network responsive to the signal applied to the delay network 30 for translating selected frequency components thereof and having a phase-shift characteristic over the selected frequency range which is of substantially the same shape and slope as the corresponding portion of the predetermined phase-shift characteristic of the delay network. This filter network is represented by the sharply tuned band-pass filter network 60 which includes a tuned primary circuit 61 coupled through the amplifier tube 32 to the detector of unit 13 and a tuned secondary circuit 62 coupled to the luminance-signal amplifier 17.

The apparatus further includes circuit means for combining the signals translated by the delay network 30 and the filter network 60 in a subtractive manner to produce a desired modification of the frequency-translating characteristics of the first channel such that the narrow range of selected frequency components translated by the filter network 60 is effectively eliminated from the signal translated by the luminance channel. This combining circuit means includes the tuned secondary circuit 62 of the filter network 60 and the resistor 40 which is the terminating resistor of the delay network 30. The relative polarity of the transformer windings of the tuned circuits 61 and 62 is such that the signal developed by the tuned secondary circuit 62 is of opposite polarity to the signal translated by the delay network 30.

With reference to the case where it is desirable to equalize the time delays between the I-signal chrominance channel and the Q-signal chrominance channel and to modify the signal-translating characteristics of the I-signal chrominance channel, signal-translating apparatus constructed in accordance with the invention comprises a first channel for translating a first signal and a second channel for translating a second signal. In this case, the first channel refers to the I chrominance channel including the units 53 and 56 while the second channel refers to the Q chrominance channel represented by the Q-signal detector 54. Also, for this case, the delay network is represented by the delay line 30 of the signal-modifying circuit 56 while the filter network responsive to the signal applied to the delay network 30 is represented by the low-pass filter network 33 which is coupled to the amplifier tube 32 of the signal-modifying circuit 56. Similarly, the circuit means for combining the signal translated by the delay network 30 and the filter network 33 is represented by the phase-inverting amplifier tube 32 and adder circuit 38 including the series-connected resistors 39 and 40, the resistor 40 being mutual to the output circuits of the delay network 30 and the filter network 33. It will be noted that the signal-modifying circuit 56 is identical to the signal-modifying circuit 16 of Fig. 1 with the exception of an inductor 35 which has been added to the low-pass filter 33 of circuit 56 in order to obtain better low-pass characteristics.

*Operation of Fig. 5 signal-translating apparatus*

Considering now the operation of the signal-translating apparatus for the two possible situations just described, the first of these situations, namely the case for delay equalization between luminance and chrominance channels and modification of the frequency-translating characteristics of the luminance channel, will be described with reference to the frequency-translating characteristic curves of Figs. 6, 7, and 8. As mentioned, delay equalization between the luminance channel including units 50 and 17 and the chrominance channel including units 52, 53, 54, 57 and 56 is obtained by selecting the delay of the delay line 30 to make up for the increased time delay of the chrominance channel.

The amplitude and phase-shift characteristics of the delay line 30 are indicated by the curves A and $\phi$ of Fig. 6 and may be identical with the corresponding curves for the delay line 30 of Fig. 1. The amplitude and phase-shift curves A and $\phi$, respectively, for the sharply tuned band-pass filter network 60 are indicated in Fig. 7. As indicated, the filter network 60 is responsive only to a narrow range of frequencies about the resonant frequency thereof. In order to eliminate the chrominance subcarrier in the luminance channel, this resonant frequency is selected to be the subcarrier frequency of 3.58 megacycles. As indicated in Fig. 8, the resultant frequency-translating characteristic resulting from the presence of both the filter network 60 and the delay line 30 is such that the amplitude-response curve A shows a relatively sharp cutoff point at the subcarrier frequency thereby substantially preventing translation of any of the chrominance subcarrier.

It should be noted that the presence of the filter network 60 produces no appreciable distortion of the luminance signal, other than removing the chrominance subcarrier, because the phase-shift characteristic $\phi$ of the filter network 60 is similar to the corresponding portion of the phase-shift characteristic of the delay line 30 over the narrow range of frequencies selected by the filter network 60. More specifically, the phase-shift characteristic $\phi$ over the central portion of the pass band of the filter network 60 is approximately linear and of the same slope as the slope of the phase-shift curve for the delay line 30. For one thing, this means that for any frequency translated by the filter network 60, the time delay through the filter network 60 is the same as the time delay through the delay line 30 for the same frequency.

The amplitude characteristic A of the filter network 60 is combined with the amplitude characteristic A of the delay line 30 in a subtractive manner because the phase shift imparted to the signal components translated by the filter network 60 differs from the phase shift imparted to the signal components translated by the delay line 30 by a factor of 180°, or some odd multiple thereof. As a result, the delay-line signal across resistor 40 is of opposite polarity to the filter network signal across tuned circuit 62 and, hence, the signals cancel one another in forming the resultant or over-all signal across the series combination of tuned circuit 62 and resistor 40. Considering the individual phase shifts in detail, at resonance the output voltage of a double tuned coupled circuit, such as the filter network 60, lags the input voltage by a factor of 90° because of the time lag involved in the reactance elements of the circuit. Now, at the network 60 resonance frequency, the delay line 30 provides a negative phase shift of 270°. As a result, the delay-line signal differs in phase from the filter network signal by a factor of 180° and the signals cancel one another. This 180° relation holds over the frequency region corresponding roughly to the pass band of the filter network 60 wherein the phase-shift curve $\phi$ for the network 60 is of very nearly the same slope as the phase-shift curve $\phi$ of the delay line 30. In this manner, the frequency-translating characteristics of the luminance channel are modified in a desired manner such that the chrominance subcarrier component is not translated thereby.

Besides preventing distortion, it is also necessary for the shape and the slope of the phase-shift characteristic of the filter network 60 over the pass band thereof to be substantially the same as that of the corresponding portion of the phase-shift characteristic of the delay line 30 in order that the chrominance subcarrier may be completely eliminated. In other words, if the phase-shift characteristics were not the same, then the signals passing through the filter network would not be 180° out of phase with the signals passing through the delay line and, hence, would not cancel one another completely.

Considering now the case where it is desired to equalize the time delays of the I chrominance channel and the Q chrominance channel and to modify the frequency-translating characteristics of the I chrominance channel, the delay line 30 of the signal-modifying circuit 56 is proportioned to provide the desired delay equalization. The desired modification of the frequency-translating characteristics of the I chrominance channel is obtained by the presence of the signal path including the connection between the anode 32*a* of the amplifier tube 32 and the network 33, the filter network 33, and the adder circuit 38, this path forming a parallel signal-translating path around the delay line 30. As this parallel signal path, the frequency-translating characteristics thereof, and the frequency-translating characteristics of the delay line 30 may be similar to those of the corresponding elements of the signal-modifying circuit 16 of the Fig. 1 receiver, the signal-modifying circuit 56 operates in the same manner as the circuit 16 of Fig. 1 so that a detailed explanation is unnecessary at this point. Briefly considered, however, the low-frequency components of the inverted polarity I chrominance signal supplied to the filter network 33 are translated by the low-pass filter network 33 and, hence, added to the I chrominance signal translated by the delay line 30 so as to cancel a portion of the low-frequency components thereof and thereby effectively boost or accentuate the high-frequency components of the I chrominance signal.

From the foregoing descriptions of the various embodiments of the invention, it will be apparent that signal-translating apparatus constructed in accordance with the present invention represents a novel and inexpensive method of obtaining a desired modification of the signal translated by one of the channels by utilizing the network already present for obtaining delay equalization between channels of multichannel apparatus such as a color-television receiver.

It is not intended that the signal-modification feature of the present invention should be limited to the compensation of the specific receiver deficiencies mentioned in the foregoing descriptions as these were intended merely as examples of the more common deficiencies presently encountered. Also, it is not intended that the invention should be limited to the specific environments shown in the drawings because signal-translating apparatus in accordance with the present invention is also useful in, for example, color-television transmitting equipment as well as the monitoring equipment therefor.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In signal-translating apparatus: a first channel for translating a first signal and having a first transmission time; a second channel for translating a second signal and having a second and different transmission time; a delay network having a predetermined phase-shift characteristic and a time delay corresponding to at least part of the difference in transmission times of the first and second channels and included in the first channel for equalizing the transmission time of the first and second channels; a filter network responsive to the signal applied to the delay network for translating selected frequency components thereof and having a phase-shift characteristic over the selected frequency range which is of substantially the same shape and slope as the corresponding portion of the predetermined phase-shift characteristic of the delay network; and circuit means for combining the signals translated by the delay network and the filter network to produce a desired modification of the frequency-translating characteristics of the first channel.

2. In color-television apparatus: a luminance channel for translating a luminance signal and having a first transmission time; a chrominance channel for translating a chrominance signal and having a second and different transmission time; a delay network having a predetermined phase-shift characteristic and a time delay corresponding to at least part of the difference in transmission times of the luminance and chrominance channels and included in the luminance channel for equalizing the transmission time of the luminance and chrominance channels; a filter network responsive to the luminance signal applied to the delay network for translating selected frequency components thereof and having a phase-shift characteristic over the selected frequency range which is of substantially the same shape and slope as the corresponding portion of the predetermined phase-shift characteristic of the delay network; and circuit means for combining the signals translated by the delay network and the filter network to produce a desired modification of the frequency-translating characteristics of the luminance channel.

3. In color-television apparatus: a first chrominance channel for translating a first chrominance signal and having a first transmission time; a second chrominance channel for translating a second chrominance signal and having a second and different transmission time; a delay network having a predetermined phase-shift characteristic and a time delay corresponding to at least part of the difference in transmission times of the first and second chrominance channels and included in the first chrominance channel for equalizing the transmission time of the first and second chrominance channels; a filter network responsive to the chrominance signal applied to the delay network for translating selected frequency components thereof and having a phase-shift characteristic over the selected frequence range which is of substantially the same shape and slope as the corresponding portion of the predetermined phase-shift characteristic of the delay network; and circuit means for combining the signals translated by the delay network and the filter network to produce a desired modification of the frequency-translating characteristics of the first chrominance channel.

4. In color-television apparatus: a first channel for translating a first signal and having a first transmission time; a second channel for translating a second signal and having a second and different transmission time; a delay network having a predetermined phase-shift characteristic and a time delay corresponding to at least part of the difference in transmission times of the first and second channels and included in the first channel for equalizing the transmission time of the first and second channels; a filter network responsive to the signal applied to the delay network for translating selected frequency components thereof and having a phase-shift characteristic over the selected frequency range which is of substantially the same shape and slope as the corresponding portion of the predetermined phase-shift characteristic of the delay network; and circuit means for combining the signals translated by the delay network and the filter network in an additive manner to produce a desired modification of the frequency-translating characteristics of the first channel such that the frequency components selected by the filter network are accentuated.

5. In color-television apparatus: a first channel for translating a first signal and having a first transmission time; a second channel for translating a second signal and having a second and different transmission time; a delay network having a predetermined phase-shift characteristic and a time delay corresponding to at least part of the difference in transmission times of the first and second channels and included in the first channel for equalizing the transmission time of the first and second channels; a filter network responsive to the signal applied to the delay network for translating selected frequency components thereof and having a phase-shift characteristic over the selected frequency range which is of substantially the same shape and slope as the corresponding portion of the predetermined phase-shift characteristic of the delay network; and circuit means for combining the signals translated by the delay network and the filter network in a subtractive manner to produce a desired modification of the frequency-translating characteristics of the first channel such that the frequency components not selected by the filter network are accentuated.

6. In color-television apparatus: a first channel for translating a first signal and having a first transmission time; a second channel for translating a second signal and having a second and different transmission time; a delay network having a predetermined phase-shift characteristic and a time delay corresponding to at least part of the difference in transmission times of the first and second channels and included in the first channel for equalizing the transmission time of the first and second channels; a low-pass filter network responsive to the signal applied to the delay network for translating selected low-frequency components thereof and having a phase-shift characteristic over the selected low-frequency range which is of substantially the same shape and slope as the corresponding portion of the predetermined phase-shift characteristic of the delay network; and circuit means for combining the signals translated by the delay network and the filter network in a subtractive manner to produce a desired modification of the frequency-translating characteristics of the first channel such that the high-frequency components of the signal translated by the first channel are accentuated.

7. In color-television apparatus: a first channel for translating a first signal and having a first transmission time; a second channel for translating a second signal and having a second and different transmission time; a delay network having a predetermined phase-shift characteristic and a time delay corresponding to at least part of the difference in transmission times of the first and second channels and included in the first channel for equalizing the transmission time of the first and second channels; a sharply tuned band-pass filter network responsive to the signal applied to the delay network for translating a narrow range of selected frequency components thereof and having a phase-shift characteristic over the selected frequency range which is of substantially the same shape and slope as the corresponding portion of the predetermined phase-shift characteristic of the delay network; and circuit means for combining the signals translated by the delay network and the filter network in a subtractive manner to produce a desired modification of the frequency-translating characteristics of the first channel such that the narrow range of selected frequency components is effectively eliminated from the signal translated by the first channel.

8. In color-television apparatus: a first channel for translating a first signal and having a first transmission time; a second channel for translating a second signal and having a second and different transmission time; a delay network having a predetermined phase-shift characteristic and a time delay corresponding to at least part of the difference in transmission times of the first and second channels and included in the first channel for equalizing the transmission time of the first and second channels; a filter network responsive to the signal applied to the delay network for translating selected frequency components thereof and having a phase-shift characteristic over the selected frequency range which is of substantially the same shape and slope as the corresponding portion of the predetermined phase-shift characteristic of the delay network; circuit means for inverting the polarity of the signal translated by the filter network relative to the polarity of the signal translated by the delay network; and a circuit for combining the signals translated by the delay network and the filter network in an additive manner to produce a desired modification of the frequency-translating characteristics of the first channel such that the frequency components not selected by the filter network are accentuated.

9. In color-television apparatus: a first channel for translating a first signal and having a first transmission time; a second channel for translating a second signal and having a second and different transmission time; a delay network having a predetermined phase-shift characteristic and a time delay corresponding to at least part of the difference in transmission times of the first and second channels and included in the first channel for translating the first signal and for equalizing the transmission time of the first and second channels; a filter network included in the first channel and responsive to the first signal for translating selected frequency components thereof and having a phase-shift characteristic over the selected frequency range which is of substantially the same shape and slope as the corresponding portion of the predetermined phase-shift characteristic of the delay network; a phase-inverter circuit included in the first channel for inverting the polarity of the signal supplied to the filter network relative to the polarity of the signal supplied to the delay network; and an adder circuit for combining the signals translated by the delay network and the filter network in an additive manner to produce a desired modification of the frequency-translating characteristics of the first channel such that the frequency components of the first signal which are not selected by the filter network are accentuated.

References Cited in the file of this patent

UNITED STATES PATENTS 2,651,673 Fredendall ---------------- Sept. 8, 1953

OTHER REFERENCES

Color TV, Rider Pub., March 1954, pages 141 and 142.

Introduction to Color Television, Admiral Corp., February 1954, pages 17 to 27.